(12) United States Patent
Fokkelman et al.

(10) Patent No.: US 8,941,481 B2
(45) Date of Patent: Jan. 27, 2015

(54) METHOD FOR ASSISTING IN MAINTENANCE OF A MOTOR VEHICLE

(75) Inventors: Joris Fokkelman, Tegernheim (DE); Martin Böld, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 344 days.

(21) Appl. No.: 13/327,177

(22) Filed: Dec. 15, 2011

(65) Prior Publication Data

US 2012/0319833 A1  Dec. 20, 2012

(30) Foreign Application Priority Data

Dec. 15, 2010  (DE) .......................... 10 2010 054 673

(51) Int. Cl.
*G01F 23/00* (2006.01)
*G07C 5/00* (2006.01)
(Continued)

(52) U.S. Cl.
CPC ............ *G07C 5/006* (2013.01); *G01F 23/0061* (2013.01); *G01F 1/007* (2013.01); *B60R 16/0234* (2013.01); *B60R 25/101* (2013.01); *B60L 11/1861* (2013.01); *B67D 7/08* (2013.01); *G01F 13/006* (2013.01); *G01C 21/3697* (2013.01); *G01F 23/00* (2013.01); *B60K 2015/03197* (2013.01); *B60K 2015/03217* (2013.01); *B60L 2250/16* (2013.01); *Y02T 10/7044* (2013.01); *Y02T 10/7005* (2013.01); *Y02T 10/705* (2013.01); *Y02T 90/16* (2013.01)
USPC ............ 340/450.2; 141/94; 141/95; 701/123; 701/31.1; 702/55

(58) Field of Classification Search
CPC ... B67D 7/08; G01F 23/0061; G01F 25/0061; G01F 23/00; G01F 23/18; G01F 13/006; G01F 1/007; G01C 21/3697; B60R 16/0232; B60R 16/0234; B60R 25/101
USPC ........... 141/94, 95; 340/450.2; 701/31.1, 123; 702/55

See application file for complete search history.

(56) References Cited

U.S. PATENT DOCUMENTS 6,761,193 B1   7/2004  Cotton et al.
7,523,770 B2 *  4/2009  Horowitz et al. ............... 141/94
(Continued)

FOREIGN PATENT DOCUMENTS

DE        100 21 721 A1    3/2001
DE     10 2008 005 327 A1   7/2008
EP         2 157 000 A1    2/2010

*Primary Examiner* — Daniell L Negron
*Assistant Examiner* — Benyam Haile
(74) *Attorney, Agent, or Firm* — Cuzen O'Connor

(57) ABSTRACT

A method for assisting in maintenance of a motor vehicle having a drive motor, an drive energy storage device, and a filling level measuring device. A request for a maintenance process is identified by a self-monitoring device with the maintenance request being transmitted as a maintenance indication to a driver by an information device. The maintenance indication is transmitted to the driver as a function of a switch-off filling level present when the vehicle drive motor is switched off and detected by the filling level measuring device. The maintenance indication is transmitted when the switch-off filling level is lower than a preset filling level threshold value or when a filling level difference between a switch-on filling level, present when the vehicle drive motor is subsequently switched on again and detected by the filling level measuring device, and the preceding switch-off filling level indicates a positive filling level value.

6 Claims, 2 Drawing Sheets

(51) Int. Cl.
*G01F 1/00* (2006.01)
*B60R 16/023* (2006.01)
*B60R 25/10* (2013.01)
*B60L 11/18* (2006.01)
*B67D 7/08* (2010.01)
*G01F 13/00* (2006.01)
*G01C 21/36* (2006.01)
*B60K 15/03* (2006.01)

(56) References Cited

U.S. PATENT DOCUMENTS

| | | |
|---|---|---|
| 2003/0069684 A1 | 4/2003 | Reimer |
| 2008/0047522 A1 | 2/2008 | Leisner et al. |
| 2009/0109022 A1* | 4/2009 | Gangopadhyay et al. .... 340/540 |
| 2010/0174443 A1 | 7/2010 | Kubota et al. |
| 2010/0280885 A1* | 11/2010 | Eckhoff et al. ............... 705/14.1 |
| 2011/0140877 A1* | 6/2011 | Gilchrist et al. ............ 340/450.2 |
| 2013/0173106 A1* | 7/2013 | Konishi .......................... 701/22 |

* cited by examiner

METHOD FOR ASSISTING IN MAINTENANCE OF A MOTOR VEHICLE

BACKGROUND OF THE INVENTION

1. Field of the Invention

The invention relates to a method for assisting in maintenance of a motor vehicle having a vehicle drive motor, a drive energy storage device, and a filling level measuring device for the vehicle drive motor. A request for a maintenance process on the motor vehicle, identified as a maintenance request by a self-monitoring device of the motor vehicle, is transmitted as a maintenance indication to a driver of the motor vehicle by an information device arranged in the motor vehicle.

2. Description of the Related Art

A method is known for a motor vehicle maintenance indication to be instantly transmitted to a driver of the vehicle when a maintenance request is identified.

DE 10 2008 005 327 A1 discloses a method for route planning and route guidance, in which method a vehicle driver has the option to prespecify services offered at a service station as a criterion for determining a journey route. The type of predefined services is based on those desired by the driver.

One disadvantage of the method known from the prior art is that the driver either receives a maintenance indication but cannot perform the maintenance at this time, or else is forced to regularly perform routine checks and to identify a maintenance request in the process.

SUMMARY OF THE INVENTION

One embodiment of the invention is based on a method of the type mentioned in the introductory part with which the maintenance indication can be better utilized by the driver.

According to one embodiment of the invention, the maintenance indication is transmitted to the driver as a function of a switch-off filling level which is present when the vehicle drive motor is switched off and which is detected by the filling level measuring device, with the maintenance indication being transmitted when either the switch-off filling level is lower than a preset filling level threshold value or when a filling level difference between a switch-on filling level, which is present when the vehicle drive motor is subsequently switched on again and which is detected by the filling level measuring device, and the preceding switch-off filling level indicates a positive filling level value.

The motor vehicle can be, for example, a passenger car or a commercial vehicle, for example a truck or a bus.

The motor vehicle can be, for example, a motor vehicle driven by an internal combustion engine. In this case, the vehicle drive motor is an internal combustion engine and the drive energy storage device is a fuel tank; the filling level measuring device measures the filling level of the fuel in the fuel tank.

The motor vehicle may also be, for example, an electric vehicle. In this case, the vehicle drive motor is an electric motor, and the drive energy storage device is a rechargeable battery, a storage device for electrical energy. In this case, the filling level measuring device measures the state of charge of the rechargeable battery.

It is particularly advantageous for the driver to receive the maintenance indication, which originates from a maintenance request, precisely when it can be expected that either the driver would currently like to refuel or refueling has just been concluded; this is because the motor vehicle is regularly at a service station in these cases and the driver usually has the option of performing the required maintenance at service stations: firstly, the motor vehicle is not in flowing traffic or not travelling at all at the service station, and secondly motor vehicle consumables and motor vehicle replacement parts for performing the maintenance are generally available at service stations. The service station can be, for example, a service station for fluid fuels or, for example, a service station for recharging electrical energy in the rechargeable battery of the motor vehicle. By virtue of the invention, the maintenance indication is advantageously transmitted to the driver close to the time at which the maintenance operation may be performed. This substantially improves the ability of the driver to utilize the maintenance indication. In addition, neither a navigation system nor a satellite-assisted position identification device are required in the motor vehicle for the purposes of the invention; additional, expensive, complicated and technical apparatuses which may possibly be at risk of failure in the motor vehicle can advantageously be dispensed with by virtue of the invention.

According to one embodiment of the invention, it is assumed that the vehicle has stopped for refueling when the filling level of the drive energy storage device when the vehicle drive motor is switched off is lower than a preset filling level threshold value. In the event of a refueling stop of this kind, it is assumed that the motor vehicle is at a service station. The filling level threshold value can be, for example, a defined reserve volume which ensures an emergency remaining travel range for operation of the motor vehicle.

According to one embodiment of the invention, it is assumed that the refueling stop is at an end when the filling level of the drive energy storage means when the drive motor is switched on is greater than when it was previously switched off, that is to say the switch-on filling level is greater than the switch-off filling level, and the difference between the switch-on filling level and the switch-off filling level indicates a positive filling level value. Therefore, it can be assumed that refueling has taken place in the meantime, but with the motor vehicle still being at the service station. The reliability of the method according to the invention can advantageously be further increased when, in the second variant of the invention, the filling level value is preset and is a not inconsiderable filling level value. This substantially rules out the possibility that, for example, refueling from a can—usually not performed at a service station—has been performed between the drive motor being switched off and switched on or that the filling level has increased due to storage means regeneration or by fuel being returned while the vehicle has been stationary. The not inconsiderable filling level value is also a filling level value which, according to experience, suggests a refueling process at a service station. The not inconsiderable filling level value in the case of a fuel in a fuel tank—corresponding to the volume of a commercially available fuel can—is preferably at least 5 liters.

The method according to the invention helps identify a time at which the driver has the option and motivation to carry out maintenance on the motor vehicle. A refueling process is selected as a suitable moment for this since the driver has already decided to perform a specific type of maintenance, specifically refueling, in this case. Refueling generally takes place at a service station and the maintenance materials that are most frequently required, including replacements parts and care materials, are usually available at a service station. Examples of maintenance indications which are transmitted to the driver by virtue of the method according to the invention can be: adjust tire pressure, refill exhaust gas after-treatment additive, for example exhaust gas after-treatment additive comprising urea; refill windshield washer liquid; refill engine oil; replace battery; refill air-conditioning gas for vehicle air-conditioning system replace bulbs; replace wiper blades; clean vehicle camera and camera lenses. The above-mentioned list represents only an exemplary selection; any maintenance process that can generally be performed by the driver at a service station can be included in principle.

In one embodiment of the invention, two different transmission presets are provided in the motor vehicle, one of these presets being set for the motor vehicle, with the maintenance indication being transmitted in accordance with a first transmission preset only when the switch-off filling level is lower than the filling level threshold value, or the maintenance indication is transmitted in accordance with the second transmission preset only when the filling level difference between the switch-on filling level and the switch-off filling level is greater than the filling level value. In this way, it is possible to use the transmission preset to establish whether the maintenance indication should be transmitted at the beginning or towards the end of a refueling stop.

According to one embodiment of the invention, the set transmission preset comprises a regional identifier. The regional identifier preferably indicates the region in which the motor vehicle is at least predominantly operated. The regional identifier can be, for example, a country identifier and specify a particular country, for example Germany, China, or the United States of America. However, it is also feasible for the regional identifier to indicate a cross-national territory, for example Europe, North America, South America, South-East Asia, or Arabia.

It is also conceivable for the maintenance indication to be transmitted to the driver, for example, in a haptic manner. However, in order for this indication to be effectively noticed and for information to be transmitted comprehensively and at the same time, it is particularly advantageous when, according to another development of the invention, the maintenance indication is transmitted to the driver in an optical and/or acoustic manner.

To advantageously further increase safety, it is particularly advantageous when, according to another development of the invention, a maintenance indication which relates to the roadworthiness of the motor vehicle is transmitted to the driver by the information device when the vehicle drive motor is switched on and additionally immediately when the request for the maintenance process is identified by the self-monitoring device. As a result, an indication, for example, for a defective bulb in a headlight or in a rear lighting unit of the motor vehicle is transmitted not only at the next refueling stop but also as early as immediately when the fault is identified, and therefore, in cases such as this, the driver can also immediately stop and perform the maintenance and also, for example, drive to a service station for this purpose.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention will be explained in greater detail in the text which follows and are illustrated in the drawing, in which.

DETAILED DESCRIPTION OF THE PRESENTLY PREFERRED EMBODIMENTS

Figure 1:
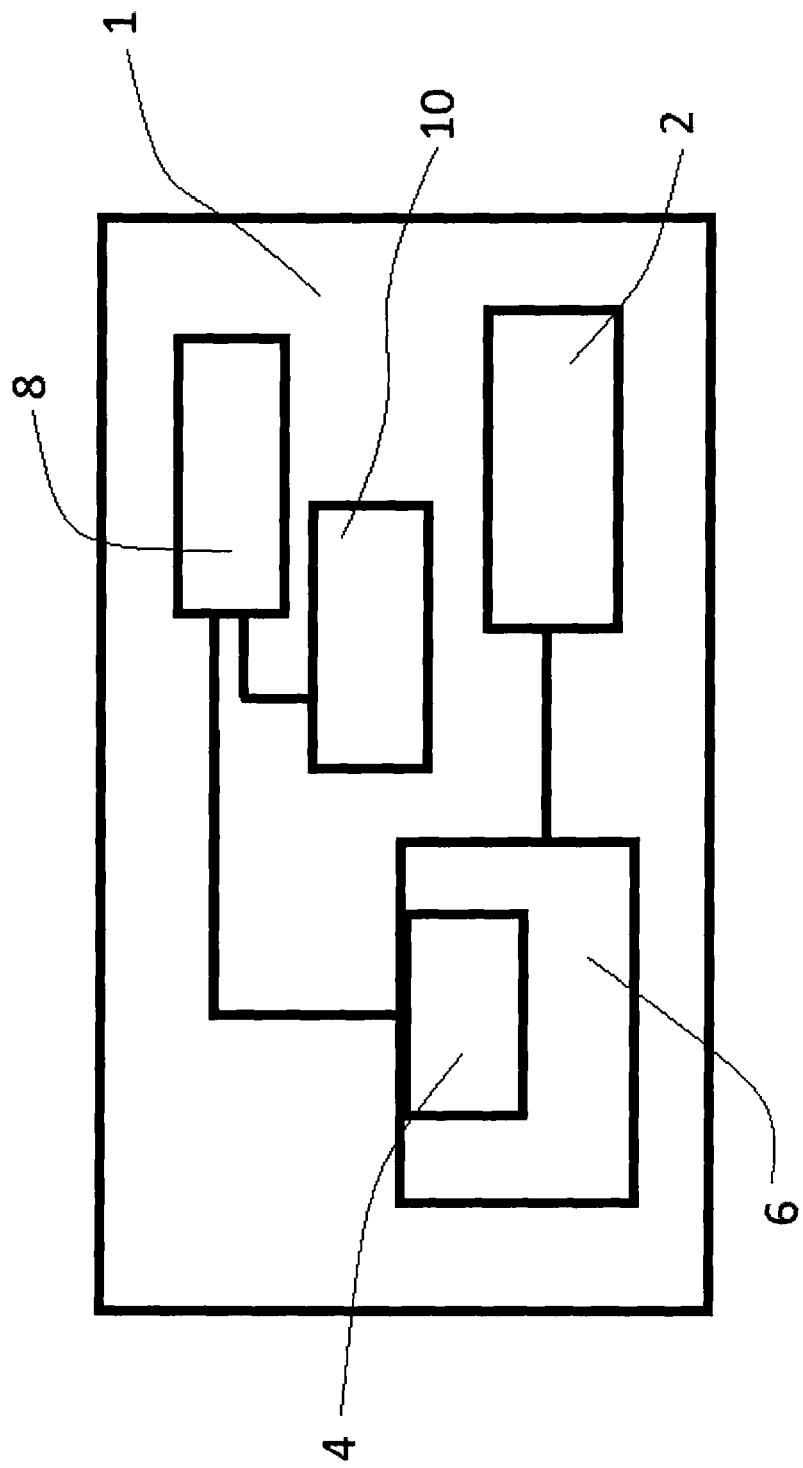
FIG. 1 is a schematic illustration of a motor vehicle.
Figure 2:
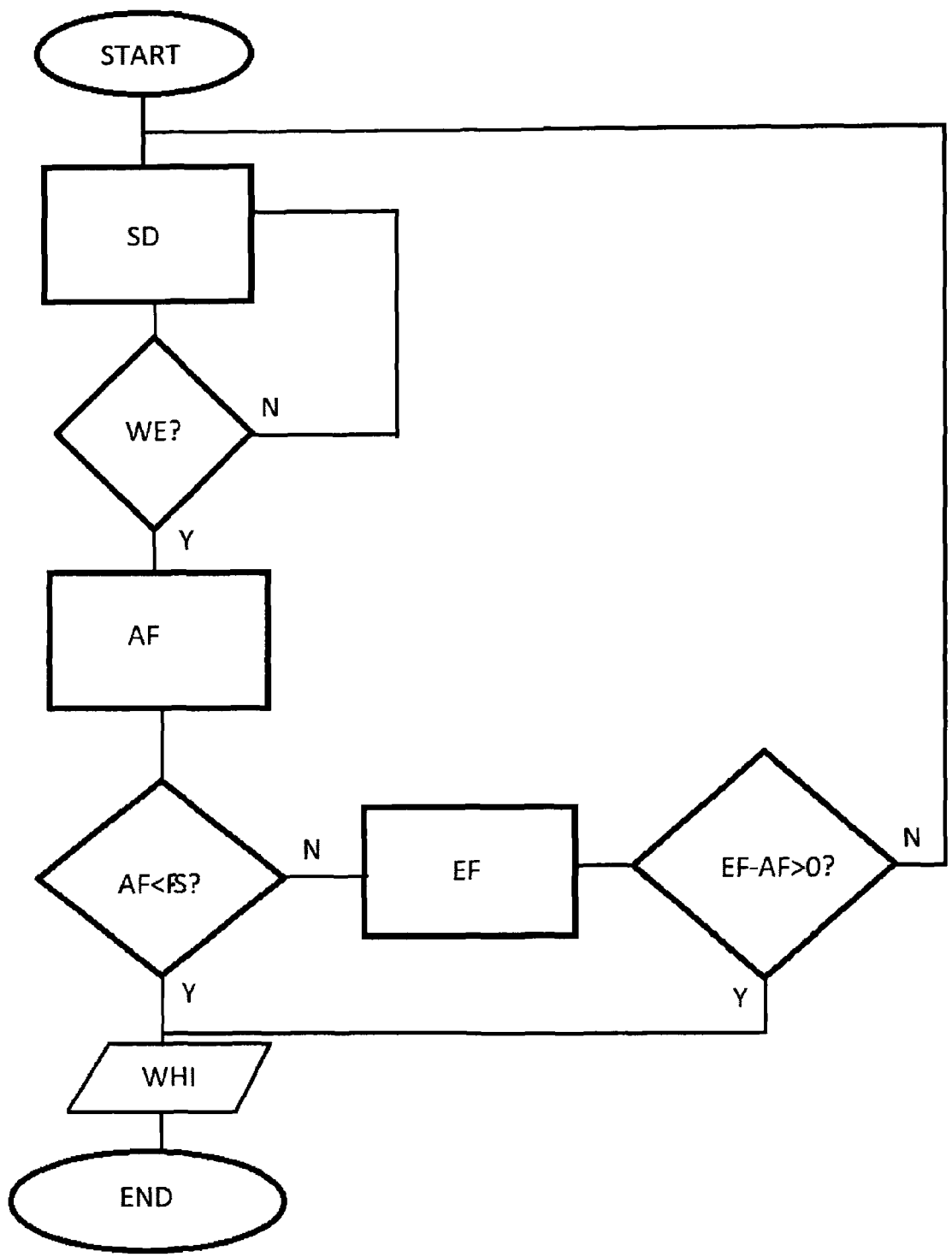
FIG. 2 is a simplified illustration of a flow chart.
Corresponding elements are in each case provided with the same reference symbols in all the figures.

An example of a method for assisting in maintenance of the motor vehicle 1 (see FIG. 1) is illustrated using a flow chart according to FIG. 2. In the flow chart, the letter Y means "yes" and the letter N means "no".

The motor vehicle 1 has a vehicle drive motor 2 and a drive energy storage device 6, which has a filling level measuring device 4, of the vehicle drive motor 2. A self-monitoring device 8 for self-diagnosis by the vehicle and an information device 10 for transmitting information to a driver of the motor vehicle 1 are also provided. The information device 10 can have, for example, an optical indicator apparatus and/or a sound generator, for example a loudspeaker.

The method for assisting in maintenance of the motor vehicle 1 proceeds in such a way that the self-monitoring device 8 carries out a self-diagnosis process SD. In this case, a check is made to determine whether a request for a maintenance process is present. If the self-monitoring device 8 of the motor vehicle 1 identifies a request for a maintenance process on the motor vehicle 1 as a maintenance request WE, this maintenance request WE is transmitted, in principle, as a maintenance indication WHI to the driver of the motor vehicle 1 by means of the information device 10 which is arranged in the motor vehicle 1, with the transmission being dependent on further conditions which will be described below.

The maintenance indication WHI is transmitted to the driver as a function of a switch-off filling level AF of the drive energy storage device 6 which is present when the vehicle drive motor 2 is switched off and which is detected by the filling level measuring device 4. In this case, the maintenance indication WHI is transmitted to the driver when, according to a first variant, the switch-off filling level AF is lower than a preset filling level threshold value FS (that is to say: AF<FS), with the filling level threshold value indicating, in particular, a reserve filling level or remaining filling level which continues to ensure operation of the vehicle drive motor 2 and therefore of the motor vehicle 1 for a limited period of time.

The maintenance indication WHI is also transmitted to the driver when, according to one embodiment, a filling level difference DF between a switch-on filling level EF, which is present when the vehicle drive motor 2 is switched on again after the vehicle drive motor 2 is switched off and which is detected by the filling level measuring device 4, and the preceding switch-off filling level AF indicates a positive filling level value (that is to say: EF−AF>0, equal to: DF>0). In particular, the positive filling level value is a not inconsiderable filling level value FM (so that in this case DF>FM); this not inconsiderable filling level value FM represents, for example, a fuel volume of 5 l.

The conditions "AF<FS" and "DF>0", in particular "DF>FM", can be checked in succession in this case, or only one of the conditions is checked in each case. That condition of the two conditions which is to be checked can preferably be preset as a transmission preset in the method.

In the variant which was mentioned first above with the condition "AF<FS", the filling level measuring device, which can have, for example, a tank sensor in a drive energy storage device which is in the form of a fuel tank, provides the information that the drive energy storage device is virtually empty. The motor vehicle 1 is stopped and the driver removes an ignition key. At this point, the driver can receive the maintenance indication WHI and be advised that maintenance is due. This variant is particularly advantageous for countries and regions in which, as part of a refueling process, it is customary to leave the motor vehicle 1 standing at a fuel dispenser at a service station after refueling in order to go and pay for the fuel which has been obtained.

In the variant mentioned second above with the condition "DF>0", in particular "DF>FM", the filling level measuring device provides the information that the drive energy storage device has just been filled, that is to say has been refueled. This variant is particularly advantageous for countries and regions in which, as part of a refueling process, after refueling it is customary to first drive the motor vehicle 1 away from the fuel dispenser to an available parking space in the service station, in order to make the fuel dispenser available again, and only then to go and pay for the fuel which has been obtained. At this point, the motor vehicle 1 can indicate the result of the self-diagnosis process SD to the driver as a maintenance indication WHI and inform the driver which maintenance operation is to be performed. The driver then leaves the motor vehicle 1 and also has the opportunity, for example, to purchase new windshield washer liquid while paying.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for assisting in maintenance of a motor vehicle having a vehicle drive motor and a drive energy storage device, which has a filling level measuring device, comprising:
   identifying a request for a maintenance process on the motor vehicle as a maintenance request by a self-monitoring device of the motor vehicle;
   transmitting the maintenance request as a maintenance indication to a driver of the motor vehicle by an information device arranged in the motor vehicle,
   wherein the maintenance indication is transmitted to the driver as a function of a switch-off filling level present when the vehicle drive motor is switched off and detected by the filling level measuring device, the maintenance indication being transmitted when one of:
      the switch-off filling level is lower than a preset filling level threshold value and
      a filling level difference between a switch-on filling level, present when the vehicle drive motor is subsequently switched on again and which is detected by the filling level measuring device, and the preceding switch-off filling level indicates a positive filling level value,
   wherein the maintenance process corresponding to the transmitted maintenance request and the transmitted maintenance indication comprises a non-fuel level related maintenance process, and
   wherein two different transmission presets are provided in the motor vehicle,
   a first preset being set for the motor vehicle, with the maintenance indication being transmitted in accordance with a first transmission preset only when the switch-off filling level is lower than the filling level threshold value, and
   a second preset being set for the motor vehicle, with the maintenance indication being transmitted in accordance with the second transmission preset only when the filling level difference between the switch-on filling level and the switch-off filling level is greater than the filling level value.

2. The method as claimed in claim 1, wherein the first and the second transmission presets each comprise a regional identifier.

3. The method as claimed in claim 1, wherein the maintenance indication is transmitted to the driver in at least one of an optical and an acoustic manner.

4. The method as claimed in claim 1, further comprising:
   transmitting by the information device the maintenance indication to the driver when the vehicle drive motor is switched on and additionally immediately when the request for the maintenance process is identified by the self-monitoring device, wherein the maintenance indication relates to the roadworthiness of the motor vehicle.

5. The method as claimed in claim 1, wherein the maintenance indication is transmitted to the driver in at least one of an optical and an acoustic manner.

6. The method as claimed in claim 5, further comprising:
   transmitting by the information device the maintenance indication to the driver when the vehicle drive motor is switched on and additionally immediately when the request for the maintenance process is identified by the self-monitoring device, wherein the maintenance indication relates to the roadworthiness of the motor vehicle.

* * * * *